United States Patent [19]

Winfield, Jr.

[11] 3,953,037

[45] Apr. 27, 1976

[54] POLISHED ROD PROTECTOR AND RECEIVER

[75] Inventor: Mason C. Winfield, Jr., Orchard Park, N.Y.

[73] Assignee: Rodgard Manufacturing Co., Inc., Orchard Park, N.Y.

[22] Filed: Dec. 5, 1974

[21] Appl. No.: 529,751

Related U.S. Application Data

[60] Division of Ser. No. 348,702, April 6, 1973, Pat. No. 3,886,804, which is a continuation-in-part of Ser. No. 249,261, May 1, 1972.

[52] U.S. Cl. .................................. 277/30; 74/18.2
[51] Int. Cl.² ..................... F16J 15/52; F16J 15/18
[58] Field of Search ................ 277/30, 53, 83, 24, 277/68; 74/18.2

[56] References Cited

UNITED STATES PATENTS

| | | | |
|---|---|---|---|
| 2,358,032 | 9/1944 | Rothwell et al. | 74/18.2 |
| 2,721,748 | 10/1955 | Tremolada | 277/30 |
| 3,186,722 | 6/1965 | Johnson | 277/30 |
| 3,270,810 | 9/1966 | Johnson | 74/18.2 |
| 3,626,770 | 12/1971 | Lindberg et al. | 74/18.2 |
| 3,666,276 | 5/1972 | Hubler | 277/30 |
| 3,796,103 | 3/1974 | Winfield | 74/18.2 |

*Primary Examiner*—Robert I. Smith
*Attorney, Agent, or Firm*—Christel & Bean

[57] ABSTRACT

An extensible polished rod protector having alternating inner and outer diameter portions defining adjacent convolutions, and annular retainer members in the form of radial, reinforcing support plates within the outer diameter portions for preventing radially inward collapsing thereof upon extension of the protector and also preventing contact between the inner diameter portions and the polished rod. The polished rod passes through a liquid receiving container having means for trapping oil accummulated therein while permitting the egress of water therefrom. A floating rod wiper assembly in the container maintains wiping engagement with the reciprocating rod while accommodating lateral shifting and wobbling thereof.

9 Claims, 10 Drawing Figures

POLISHED ROD PROTECTOR AND RECEIVER

CROSS-REFERENCE TO A RELATED APPLICATION

This is a division of application Ser. No. 348,702 filed Apr. 6, 1973, now U.S. Pat. No. 3,886,804 which is a continuation-in-part of my pending application Ser. No. 249,261, filed May 1, 1972 on a Polished Rod Protector.

BACKGROUND OF THE INVENTION

This invention relates to a polished rod protector and receiver and, more particularly, to an improved reinforced extensible and collapsible shroud for a polished rod and an improved liquid receiving container used in conjunction with the polished rod. While not limited thereto, the protector of this invention is particularly useful with polished rods having a high extension factor, as in oil wells for example.

In the oil well pumping art, polished rods are used to connect a string of sucker rods which actuate a pump at the bottom of the well to the external means of reciprocation. The polished rod extends through a stuffing box which includes packing for closely engaging the reciprocating polished rod to prevent the fluid product of the well from escaping. In its extended position a considerable portion of the polished rod projects above the stuffing box, and unless protected, is exposed to atmospheric dust and other foreign abrasive particles which tend to accumulate on the reciprocating rod and be carried therewith to the packing within the stuffing box. Such accumulations are abrasive, and cause the polished rod and the packing to wear excessively, resulting in leakage therebetween and requiring frequent replacement thereof. The frequency of replacement has a direct relation to economy of operation, and leakage of the fluid product poses an environmental pollution problem of increasing concern.

It has been proposed to protect polished rods by enclosing the projecting portion thereof in an elongated, extensible bellows having a plurality of convolutions intended to permit contraction and extension thereof in a mannner accommodating retraction and extension of the reciprocating rod. See, for example, U.S. Pat. Nos. 3,186,722 and 3,270,810.

While this proposal has merit, it has not heretofore been adopted because the bellows must be capable of repeated extension to a length several times its retracted length, and a typical bellows is neither intended for nor capable of operation over such a range. The problem arises because a typical oil well polished rod will project only a few inches from the stuffing box when retracted, and as much as nine feet or more when extended. If a typical bellows capable of being collapsed to a length of a few inches is extended several feet it is stretched beyond its capabilities. The bellows material does not stretch uniformly but puckers, creating zones of weakness and resulting in rapid failure of the bellows.

The polished rod protector disclosed in application Ser. No. 249,261 overcomes these problems and provides a convoluted protector shroud capable of such extension and in which the outer diameter portions are reinforced against radial collapse. However, the shroud is capable of lateral movement which could result in wear-producing contact between the polished rod and the inner diameter portions of the shroud and it is desirable to prevent this.

In addition, it is desirable to provide a receiver for liquids and gases which may leak past the stuffing box, thereby to control the disposal thereof. Such liquids include oil and salt water, and it is known to accumulate them in a receiver having an overflow discharge. However, because oil floats on water the oil component normally will discharge first with the result that its benefits as a lubricant are lost to the reciprocating rod which is instead exposed to the corrosive effect of the retained salt water which may also contain various deleterious contaminants.

In the absence of such lubrication, the rod can heat up, for example when pumping dry at the start of a cycle, which can be destructive of the packing particularly when the latter has been tightened against the rod in an effort to compensate for wear.

Also, oil well polished rods are very apt to shift position as they reciprocate and move into and out of alignment. This poses a problem with conventional rod wiper elements, which generally are fixedly mounted and do not readily accommodate such lateral positional shifting and/or wobbling of the rod during reciprocation thereof.

In addition, it is customary to intermittently partially rotate polished rods, both to prevent uneven wear of the rod as it reciprocates in the stuffing box, and to actuate paraffin scrapers in the well casing.

SUMMARY OF THE INVENTION

It is an object of the present invention to provide a polished rod protector having the advantageous features of the protector disclosed in my pending application Ser. No. 249,261 and also incorporating means for preventing wear-producing contact between the reciprocating rod and the inner diameter portions of the shroud.

It is another object of this invention to provide an improved liquid receiver in conjunction with a polished rod in which escaping oil is retained for lubrication of the reciprocating rod.

It is a further object of the present invention to provide an improved rod wiper assembly accommodating lateral shifting or wobbling of a reciprocating polished rod.

Still another object of this invention is to provide a rod protector shroud connection which will accommodate rotation of the rod.

In one aspect thereof, the polished rod protector of the present invention is characterized by the provision of an extensible member having inner and outer diameter portions, defining adjacent convolutions, the outer diameter portions being provided with reinforcing members in the form of radial support plates which prevent inward collapse of these outer diameter portions and which also prevent contact between the inner diameter portions and the reciprocating rod. A liquid receiving container is mounted about the lower exposed portion of the polished rod to accumulate oil and water leaking past the stuffing box and a baffle plate arrangement is provided in the container adjacent the discharge outlet thereof to trap oil within the container for rod lubrication and cooling while permitting the discharge of the water component. A floating rod wiper assembly is mounted within the container for accommodating lateral shifting and/or wobbling of the polished rod during reciprocation thereof without shifting the container. A floating connection between the upper end of the protector member and the rod accommodates rotation of the latter.

The foregoing and other objects, advantages and characterizing features of this invention will become clearly apparent from the ensuing detailed description of an illustrative embodiment thereof, taken together with the accompanying drawings wherein like reference numerals denote like parts throughout the various views.

DETAILED DESCRIPTION OF AN ILLUSTRATIVE EMBODIMENT

Figure 1:
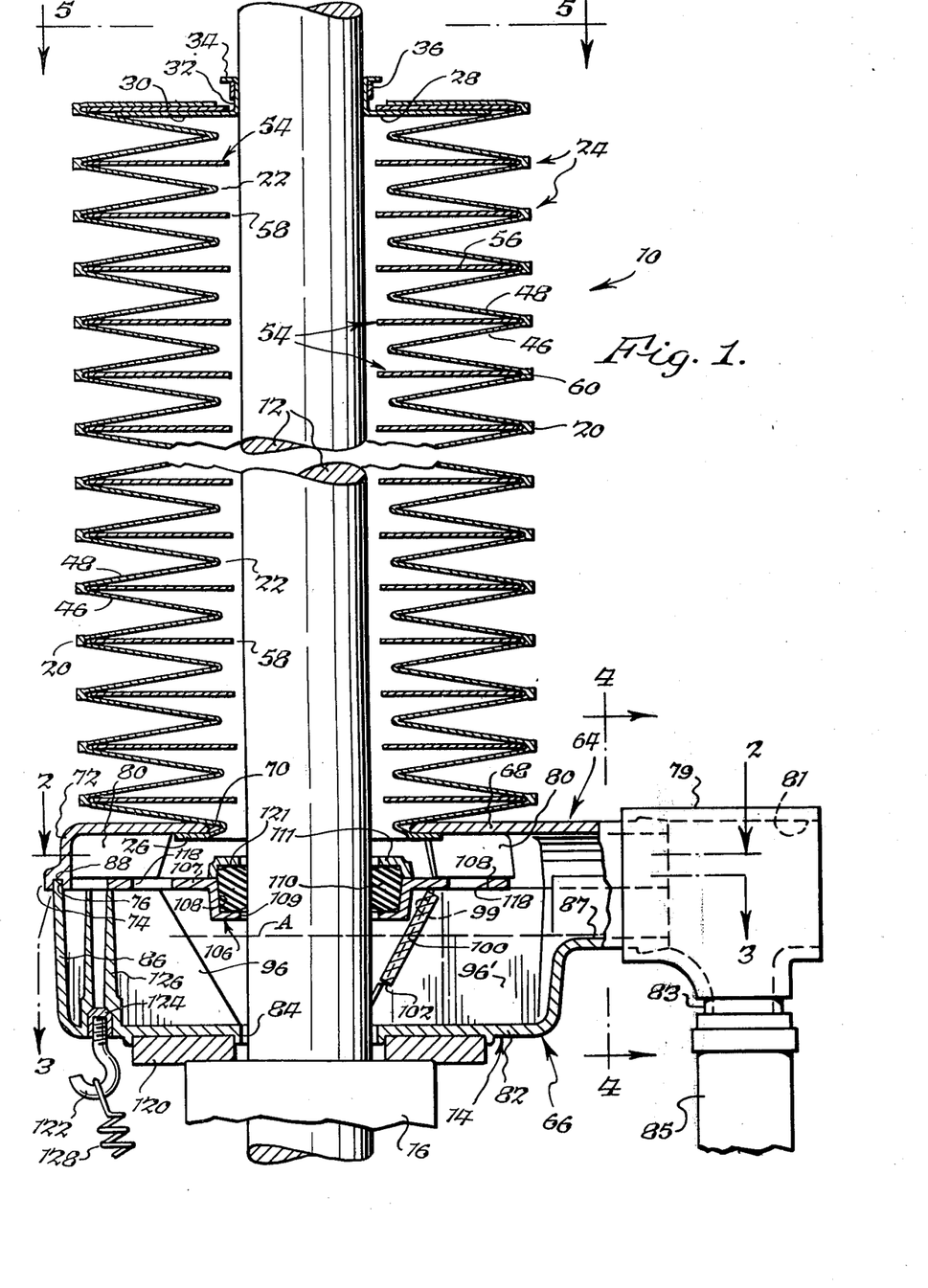
FIG. 1 is a vertical sectional view of a polished rod protector and receiver constructed in accordance with this invention, the protector and rod being shown in an extended position, and the upper, intermediate, and lower end portions of the rod and the intermediate portions of the protector being broken away fro convenience in illustration.

Referring now in detail to the illustrative embodiment depicted in the accompanying drawings, there is shown in FIG. 1 a polished rod protector of this invention, generally designated 10, encircling the projecting upper end of a reciprocating polished rod 12 for shielding the latter against dust, foreign particles and other deleterious materials. Plished rod 12 is incorporated in a pumping system of a type utilized in oil wells, and extends through a liquid receiving container of this invention, generally designated 14, and a stuffing box 16 which can be of a type conventionally used in an oil well pumping operation. Rod 12 is connected at its lower end to a string of sucker rods (not shown) extending to the bottom of the well to actuate a pump, also not shown. The upper end of polished rod 12 is connected to a suitable drive means (not shown) for reciprocating polished rod 12.

Published rod protector 19 comprises a longitudinally extensible member having a plurality of alternating relatively large and small diameter portions defining crest protions 20 and root portions 22, respectively, forming a plurality of serially connected convolutions 24. The lower end of protector member 10 terminates in a lip portion 26 freely suspended within container 14 and radially spaced from polished rod 12 to provide a "floating" connection with container 14 in order to be self-aligning with polished rod 12. In use, lip portion 26 is retained within container 14 by the engagement of the former beneath the top wall of the latter upon extension of protector 10, as shown in FIG. 1, while permitting the lower end thereof to shift laterally for self-alignment with rod 12. Lip 26 is thickened, or can be otherwise reinforced to resiliently yieldably retain its shape and thereby preclude passage through opening 70 of container 14 under normal conditions of use, while being manually deformable when desired for assembly with and disassembly from the container by passage through opening 70.

Figure 5:
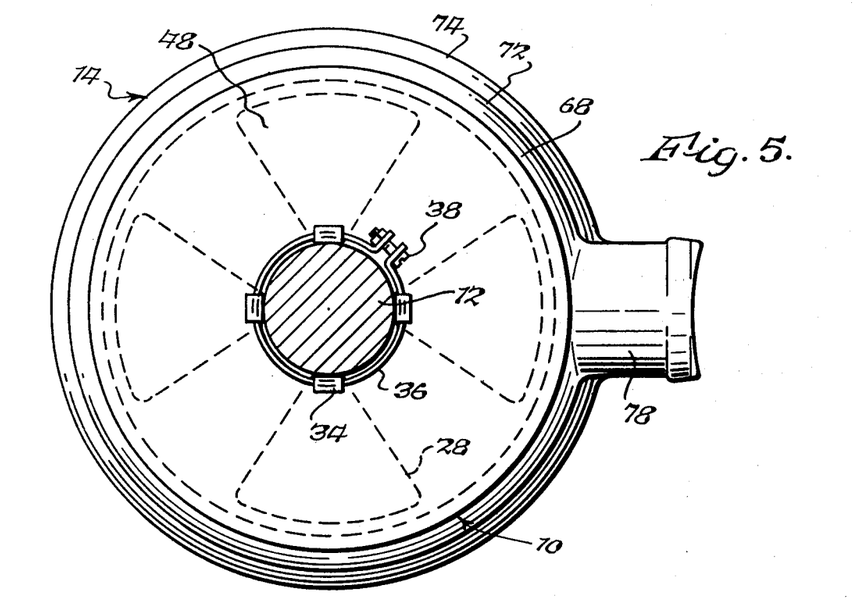
FIG. 5 is a cross sectional view through the rod, taken about on line 5—5 of FIG. 1, showing the upper end of the protector in plan.

The opposite or upper end of protector 10 is loosely connected to the upper end of polished rod 12 for reciprocating movement therewith. To this end, there are provided a plurality of support brackets 28, four in the illustrated example, each having a fan-shaped body 30, an upstanding neck 32 at the inner end thereof bearing against rod 12 and which can be curved to conform to the curvature of rod 12, and a flange 34 at the upper end of neck 32 projecting therefrom toward the outer end of body 30. In use, brackets 28 are positioned about rod 12 as indicated in FIG. 5 and releasably clamped thereto by a spring clamp 36 encircling the bracket necks 32 and drawn into clamping engagement therewith and with rod 12 by bolt 38. The bodies 30 of brackets 28 project radially outwardly from rod 12 beneath a reinforcing plate 54, described in detail hereinafter, at the upper end of protector 10 in supporting relation thereto. Bracket bodies 30 terminate short of crest portion 20 while projecting beneath plate 54 through a major portion of the radius and to a point near the outer periphery thereof. The provision of relatively evenly spaced fan shaped support bracket bodies assures a balanced, well distributed support for the upper end of protector 10, with the advantage that bodies 30 simply slide beneath plate 54 when rod 12 is rotated, for example in paraffin scraping. In addition to accommodating such relative rotation, brackets 28 can slide beneath the top plate 54 to accommodate lateral shifting and wobbling of rod 12. Flanges 34 assure proper placement of clamp 36, and strengthen the brackets which also have a reinforcing rib at the juncture between body 30 and neck 32.

The outermost end of protector shroud 10 can be a simple wall portion 48, described hereafter, overlying plate 54 which supports the same substantially completely throughout by extending to crest 20.

For assembly, brackets 28 are simply slipped into place within protector 10 and about rod 12 and then clamped to the latter.

Figures 6, 7:
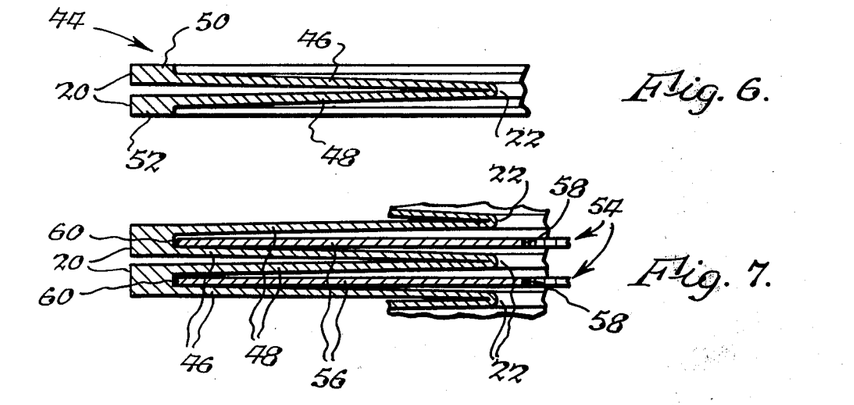
FIG. 6 is a fragmentary vertical sectional view, on an enlarged scale, showing a molded, single section of the polished rod protector of FIG. 1.
FIG. 7 is a fragmentary vertical sectional view, illustrating two protector sections bonded together and provided with reinforcing plates between the sections.

Protector 10 is of the type disclosed in my pending application Ser. No. 249,261, and is made of a highly elastic, resiliently yieldable elastomeric material, preferably polyurethane, or any other suitable material having similar properties of durability, sufficient flex and elongation capabilites, high tear and abrasion resistance and capable of withstanding the temperature extremes, ultra violet rays, weathering, oxidation, oils, acids and deleterious chemicals to which it may be exposed. Protector 10 is formed of a plurality of individually molded, one-piece sections 44 (FIG. 6) of unitary construction, each comprising a first radial wall portion 46 and a second radial wall portion 48 integrally joined at their inner ends to form root portion 22 and terminating at their outer ends in oppositely facing, generally flat, annular enlargements or rims 50 and 52. To form the composite structure 10, sections 44 are secured together at their outer peripheries by bonding the annular flat surface of rim 50 of one of the sections 44 to the annular flat mating surface of rim 52 of the adjacent section 44. The bonding of adjacent sections 44 can be effected by a suitable adhesive or by the application of heat and pressure or ultrasonically, as desired. The individual sections 44 are molded in a collapsed condition as shown in FIG. 6, causing this to be their natural, relaxed state, and when joined they impart this characteristic to the composite structure which also assumes a collapsed condition in its relaxed state. This insures proper collapsing of protector 10 to a compressed height equalling the stacked thicknesses of rims 50 and 52 of the assembled protector 10, thereby accommodating the relatively short length of rod 12 which projects in its fully retracted position. This is in sharp contrast to a typical conventional bellows which is molded in a partially extended or open condition, must be forced to the fully collapsed condition obtained by the instant invention in its relaxed state, and would not be operable over such a range as herein contemplated.

When protector 10 is extended, crest portions 20 normally would tend to collapse and would pucker as they seek to occupy a lesser space. Such puckering would result in loss of control and introduces zones of weakness, all of which is undesirable and potentially destructive of the protector.

While this tendency to pucker is resisted by the thickened rims 50 and 52 they do not have sufficient strength to prevent such inward collapsing. Therefore, as in the disclosure of my pending application, the crest portions are reinforced against such collapse. In addition, it is a feature of this invention that the root portions 22 of protector 10 are supported in spaced relation to rod 12, in a manner avoiding contact therebetween.

Figure 8:
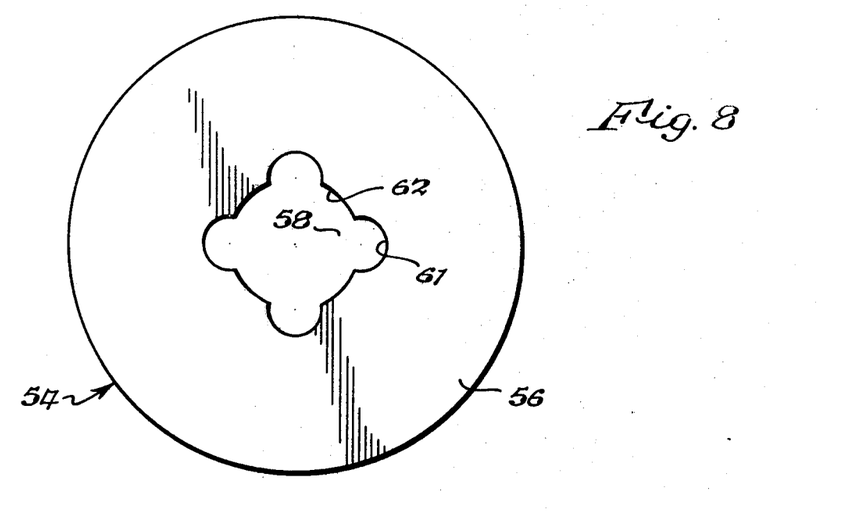
FIG. 8 is a plan view of one of the reinforcing plates.
Figure 9:
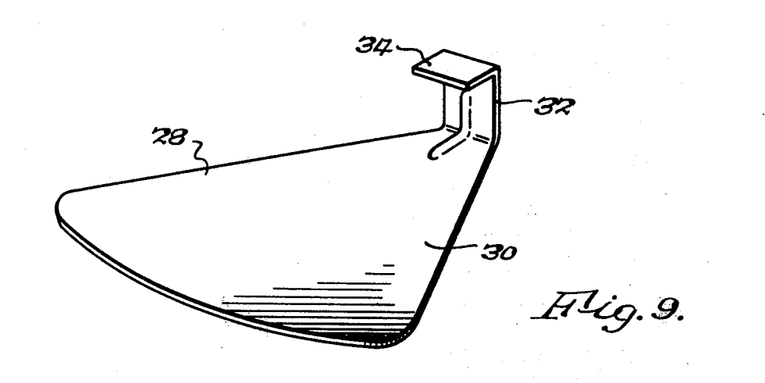
FIG. 9 is a perspective view of a support bracket used at the upper end of the protector.

To this end, reinforcement members in the form of plates 54 are disposed within convolutions 24 of protector 10 between adjacent sections 44. Each plate 54 comprises an annular body 56 having a central opening 58 therethrough larger than the diameter of polished rod 12 to preclude interference therewith upon reciprocating movement of rod 12. The diameter of plates 54 is just slightly less than the inner diameter of the crest portions, whereby the outer peripheral edges 60 of plates 54 are disposed closely adjacent the junctures of rims 50 and 52, preventing radial inward movement of crest portions 20. Plates 54 thereby reinforce and strengthen the outer crest portions 20, forcing protector 10 to maintain its outer diameter. Plates 54 also serve as spacing elements maintaining the material of shroud 10 out of contact with rod 12. Such contact between the reciprocating rod and the shroud might result from extreme wobble of the rod, and also can be produced by wind action and other external forces, and is undesirable because of the consequent wearing of the shroud material. This is avoided with the instant invention because the inner diameter of plates 54, while greater than the diameter of rod 12 to avoid binding thereon, is less than the inner diameter of protector 10 at root portions 22 with the result that plates 54 will engage rod 12 upon relative lateral movement thereof and upon such engagement will hold the crest portions 20 against continued movement toward rod 12 and thereby support and maintain all of the shroud, including its root portions 22, in spaced relation to rod 12 and out of contact therewith. Plates 54 are recessed at spaced locations around their inner periphery, as shown at 61, to provide relief for proper breathing of protector 10 as it is extended and collapsed. Recesses 61 extend outwardly of the inner diameter of protector 10 and provide increased passage area for freer air movement into and out of the protector, and also reduced drag upon contact of plate 54 with rod 12, while retaining adequate stop portions 62 within the inner diameter of protector 10 for engagement against rod 12.

Plates 54 are made of a high-impact, substantially rigid material, preferably high impact polypropylene, or any other suitable material having similar properties of strength, durability, high tear and abrasion resistance. Preferably, plates 54 are formed to the desired shape by an injection molding process from the inside diameter outwardly, thereby providing an evenly stressed circular plate offering a substantial resistance to inward deformation and avoiding the objectionable relieving of such desirable stressing which would result from stamping or machining from sheet stock.

Plates 54 therefore reinforce crest portions 20, causing them to rigidly maintain their circularity as protector 10 extends, and also support root portions 22 in spaced relation to rod 12. It has been found that a support plate 54 of this invention offers greater strength and resistance to buckling than a band or ring of metal wire having the same thickness as plate 54. Plates 54 are sufficiently thin so as not to interfere with the complete collapsing of protector 10, their thickness being less than the spacing between walls 46, 48 within crests 20. The outer plate 54 also slide easily on support brackets 28.

With the crest portions 20 held against collapse, root portions 22 will stretch and expand as protector 10 is extended, the amount of stretching being greatest at the inner diameter root portions 22. To reduce the force required for this, radial wall portions 46 and 48 are tapered inwardly from their outer peripheral edges toward root portions 22 to provide a progressively decreasing thickness from the outer peripheries of wall portions 46 and 48 to the inner peripheries thereof, whereby the thinnest material is provided at the zones of greatest stretching. The provision of a continuous taper in radial wall portions 46 and 48 to form relatively thin inner portions requires less force to stretch or extend these walls at root portions 22, thereby reducing the load on the polished rod reciprocating drive means.

While the protector of this invention is illustrated herein as a shroud for a polished rod used in oil well pumping operations, it should be understood that the utility thereof is in no way limited thereto. The protector of this invention can be utilized in any environment where it is desired to protect a polished rod, including air, hydraulic and mechanically actuated piston rods, and the like.

A significant feature of this invention resides in the liquid receiving container 14, which is constructed to assure the retention of a sufficient quantity of oil therein for cooling and lubrication of rod 12 while permitting the egress of contaminated or corrosive liquids, such as salt water for example. Container 14 consists of a housing comprising an upper housing portion 64 and a lower housing portion 66. Upper housing portion 64 is provided with a top wall 68 having a central opening 70 therein and a side wall 72 having a lower peripheral edge 74 provided withh a downwardly opening groove or recess 76. Side wall 72 is provided with a generally semi-circular outlet portion 78 extending radially outwardly from upper housing 64. A plurality of circumferentially spaced, integral, vertical plates or fins 80 depend from top wall 68 and extend radially inwardly from side wall 72 for a purpose that will hereinafter become apparent.

Figures 3, 4:
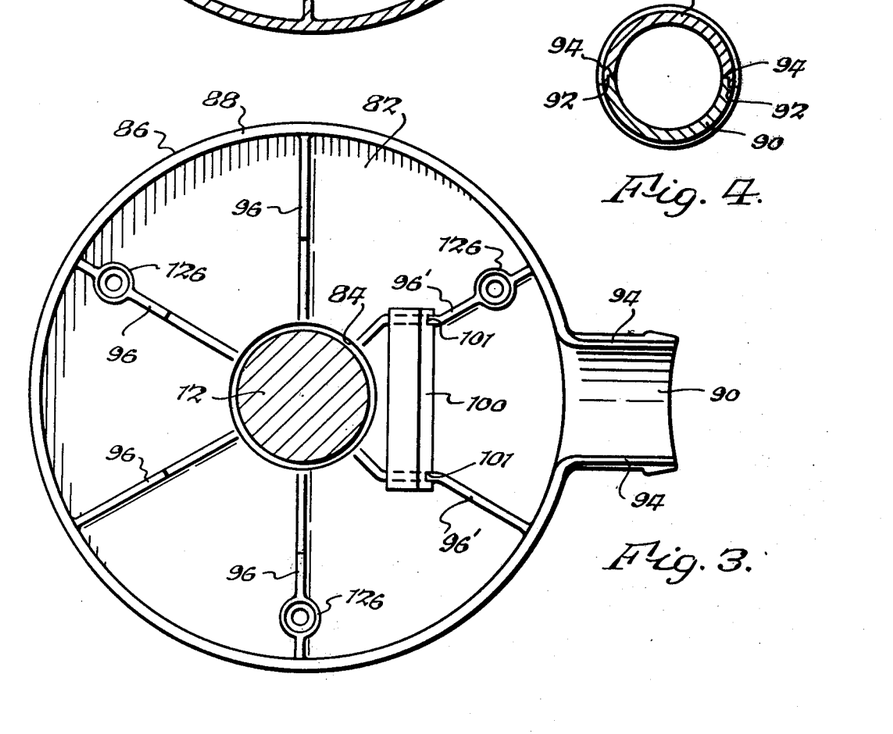
FIG. 3 is a cross sectional view thereof, taken about on line 3—3 of FIG. 1 and showing the lower housing of the receiver in plan.
FIG. 4 is a vertical, sectional view thereof, taken about on line 4—4 of FIG. 1.

The lower housing 66 is provided with a bottom wall 82 having a central opening 84 in registry with upper housing opening 70 for receiving polished rod 12 therethrough. Lower housing 66 includes a sidewall 86 having an upper peripheral edge 88 received in the upper housing recess 76 to form container 14. Side wall 86 is provided with a semi-circular outlet portion 90 extending radially outwardly from lower housing 66 and forming with upper housing portion 78 a discharge outlet for the liquid receiving container 14, which outlet is adapted to receive a Tee 79 having an air inlet and outlet opening 81 for the escape of air from and supply of air to protector 10. Tee 79 also is provided with a connection 83 to a liquid overflow conduit 85. As shown in FIG. 4, the longitudinal opposite mating edges 92, 94 of portions 7, 90 overlap to form a lapped joint therebetween. A plurality of circumferentially spaced, integral plates or fins 96, 96' corresponding in total number to fins 80, project upwardly from bottom wall 82 and radially inwardly from side wall 86 for a purpose that will hereinafter be described. The pair of fins 96' which project inwardly from side wall 88 adjacent opposite sides of outlet portion 90 are stepped or otherwise formed adjacent their inner ends, as indicated at 99, to support an oil dam in the form of a baffle plate 100 inclined in a downward direction toward opening 84 (FIG. 1) and having a lower edge 102 spaced above bottom wall 82. Dam 100 is cemented or bonded in place against fins 96' and may be grooved to receive the fin edges, as shown at 101 in FIG. 3.

Any oil and water escaping past stuffing box 16 is accumulated in container 14 and the excess accumulation thereof is drawn off by overflow through the container outlet and conduit 85. Normally this would result in discharge of the oil before the water, because the oil component of the accumulated liquid has a lower specific gravity than the water component and floats thereon whereby the harmful water would be trapped in contact with the rod while the beneficial oil is discharged. This is avoided by the receiver of this invention wherein a certain minimum amount of oil is retained in container 14 for lubricating polished rod 12 and keeping it cool. To this end, fins 96' and baffle plate 100 extend above the level of the bottom wall 87 of the outlet and act as barrier walls defining a discharge passage to the outlet 78, 90 and permitting the overflow discharge of accumulated liquid only through the opening beneath lower edge 102 of dam 100 and bottom wall 82 of the receiver. Fins 96' and dam 100 extend above the lower wall 87 of outlet portion 90 a distance sufficient to offset the difference between the specific gravity of the oil and water components.

Therefore, as the liquid level in container 14 rises, for example to the level A in FIG. 1, walls 98 and dam 100 hold back all except the liquid passing beneath dam 100. Since the oil component rises to the top of the accumulated liquid only a small portion of the oil will be discharged and the remainder will be held back as the water component passes beneath dam 100 and is discharged. Accordingly, the discharge contains a major portion of water and relatively little oil. The proportion of water to oil remaining in container 14 will be low and of relatively little adverse effect. Thus, plate 100 not only traps a sufficient amount of oil for lubrication and cooling, but also assists in the discharge of excessive amounts of water, which may be contaminated and potentially destructive to the rod.

Excess liquid in the container 14 will overflow dam 100, the upper edge of which is below the upper edge of fins 96, 96'.

When installing the protector-container of this invention, the container is initially filled with oil to the point of overflow. Dam 100 and fins 96' assume retention of oil for cooling and lubricating rod 12, resulting in longer packing life. The retained oil also acts as a barrier to blow off spray.

Figure 2:
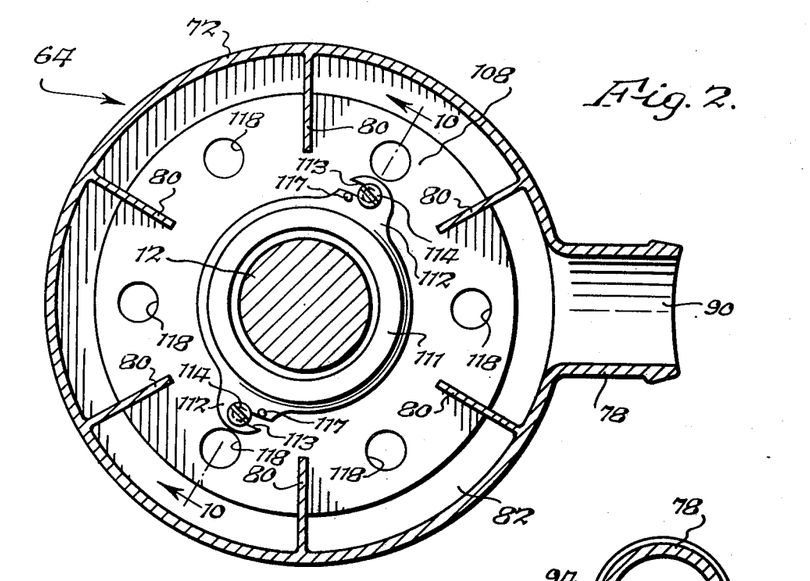
FIG. 2 is a cross sectional view thereof taken about on line 2—2 of FIG. 1 with parts omitted for clarity in illustration.
Figure 10:
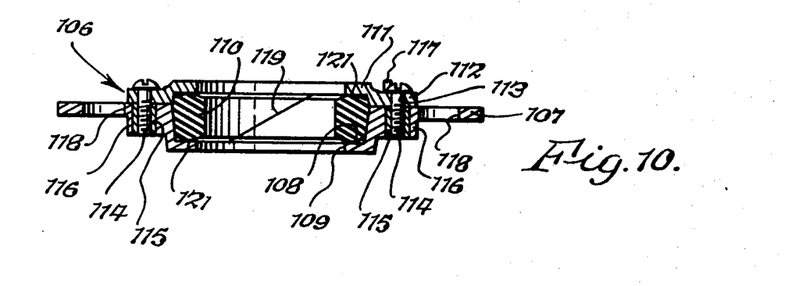
FIG. 10 is a vertical sectional view, taken about on line 10—10 of FIG. 2.

Another important feature of the present invention is the provision of a floating rod wiper assembly, generally designated 106, for accommodating lateral positional shifting or wobbling of polished rod 12, which often occurs during reciprocating movement thereof. Assembly 106 comprises an annular plate 107 supported in container 14 between lower fins 96 and upper fins 80 and having a central dish-shaped cavity 108 provided with a central opening 109 for receiving polished rod 12 therethrough. As best shown in FIGS. 2 and 10, an annular, resiliently yieldable, split rod wiper element 110 is received in cavity 108 and held in place therein by a retainer ring 111 also having an opposed cavity for receiving the other side of element 110. Retainer ring 111 has diametrically opposed lugs 112 provided with oppositely directed grooves 113, respectively, for receiving a pair of screw fasteners 114 threaded into tapped liners 115 (FIG. 10) provided in diametrically opposed bosses 116 formed along the inner peripheral edge of plate 107 and integral therewith. An upstanding abutment in the form of a pin 117 is formed integral with each lug 112 adjacent the associated groove 113 to provide an obstruction for the heads of screws 114 when the latter are threaded sufficiently, even though not completely, into their associated tapped liners 115 to preclude clockwise rotation and thereby detachment of retainer ring 111 from plate 107. Pins 117 provide a safety feature, preventing detachment of retainer ring 111 from plate 107 under normal conditions of operation unless screws 114 are threaded outwardly sufficiently for the heads thereof to clear pins 117. A plurality of circumferentially spaced openings 118 are provided in plate 107 to facilitate breathing and to enable any oil runoff above plate 107 to be returned to container 14 via such openings 118 rather than over the peripheral edge of plate 107. Plate 107 and container ring 111 preferably are formed of polycarbonate by a suitable injection molding process.

Rod wiper element 110 has a relatively large thickness and is split along a beveled or inclined parting line 119 (FIG. 10) to facilitate replacement thereof and to provide relatively large overlapping edge portions for preventing leakage through the parting line. Element 110 is provided with annular, arcuately-shaped beads 121 on opposite sides thereof for sealing engagement against the opposite end walls of cavity 108 and retainer member 111.

While plate 107 is held by fins 80, 96 against any significant movement along the axis of rod 12, it can move laterally between the upper and lower fins 80 and 96 which are spaced apart in the direction of the rod axis a distance slightly greater than the thickness of plate 108, to provide sliding clearance. Wiper element 110 provides a resiliently yieldable connection between plate 107 and polished rod 12, maintaining wiping engagement with rod 12 while accommodating tilting thereof relative to the plane of plate 107 as the latter shifts laterally upon lateral or wobbling movement of the reciprocating polished rod 12. Wiper assembly 106 also serves as a deflector so that in the event of failure of the stuffing box packing, any escape of oil and water will be deflected downwardly and ultimately discharged through the container outlet for collection rather than flow upwardly through container opening 70 into protector 10.

Should wiper element 110 require replacement, lip portion 26 of the lower end of protector 10 is slipped out of container opening 70, permitting the operator to reach in, thread screws 114 outwardly sufficiently for the heads thereof to clear pins 117, and then rotate retainer ring 111 in a clockwise direction as viewed in FIG. 2 to disengage screws 114 from grooves 113. Retainer ring 111 can then be detached to remove and replace the split wiper element 110. Retainer ring 11 is then reassembled to plate 107 for captively retaining wiper element 110 in place.

As shown in FIG. 1, a resilient annular sealing pad 120, preferably formed of closed cell polyethylene foam, is interposed between container bottom wall 82 which is formed with radially spaced annular ribs receiving and retaining the same and the upper end of stuffing box 16 to provide a fluid tight seal therebetween. Three holddown hook bolts 122 are threaded into suitable threaded inserts 124 provided in bosses 126 formed in every second lower fin 96, 96' to secure container 14 to the well-head or some other suitable stationary structure as by means of connecting tension springs 128. Bosses 126 extend upwardly, opening through the upper edges of fins 96, thereby preserving the liquid-tight integrity of the lower container section. These springs 128 exert constant downward pressure on container 14 to insure proper sealing by pad 120 and to counteract any lifting effect resulting from extension of protector 10.

In use, as polished rod 12 is extended from its retracted position, it carries the upper end of protector 10 therewith by means of engagement of support brackets 28 with plate 54 beneath the outermost wall 48. This opens the uppermost section 44 by moving the outer diameter rim portions 50 and 52 thereof apart. In doing this, the material of root portion 22 of such section is slightly stretched. After very limited stretching of that particular root portion, well within the elastic capabilities of the material, the succeeding section 44 is opened, in the same manner, and this continues with succeeding sections until rod 12 is fully extended. Support plates 54 reinforce the outer peripheries of walls 46 and 48, preventing radial collapse and puckering of crest portions 20. Upon retraction of polished rod 12, clamp 28 and plate 40 move downwardly therewith. Upon removal of the upward pressure tending to stretch walls 46 and 48 of each section 44, they seek to restore themselves to their relaxed state, thereby assuming a collapsed condition. This continues progressively downwardly with each succeeding section until rod 12 is fully retracted and protector 10 is completely collapsed. As rod 12 reciprocates plates 54 keep the protector shroud out of contact therewith, and the floating rod wiper assembly 106 effects rod wiping while accommodating any lateral play or wobbling of the reciprocating polished rod 12. Any water and oil escaping past stuffing box 16 is collected in container 14 and plate 100 serves to trap at least a predetermined amount of oil therein for rod lubrication and cooling while permitting the egress of excess water outwardly through the container outlet.

Support brackets 28 provide a floating connection accommodating rotation of rod 12 relative to protector 10, and the bodies 30 thereof are thin, on the order of the thickness of plates 54, thereby adding nothing of significance to the stacked height of the protector.

From the foregoing, it is apparent that the present invention fully accomplishes its intended objects and provides an improved polished rod protector and liquid receiving container therefor. A preferred form of this invention having been disclosed in detail, it is to be understood that this has been done by way of illustration only.

I claim:

1. A liquid receiving container comprising, in combination with a reciprocable rod passing therethrough, a housing having a top wall, a bottom wall and a side wall, said top and bottom walls being provided with aligned openings for receiving said rod therethrough, a resiliently yieldable rod wiper element in wiping engagement with said rod, mounting means affixed to said wiper element, and means supporting said mounting means in said housing for lateral movement therewithin and restrained axial movement relative to said rod thereby enabling said wiper element to accommodate lateral shifting and wobbling of said reciprocating rod.

2. A liquid receiving container according to claim 1 wherein said supporting means comprises a plurality of axially spaced apart fins extending inwardly from said top and bottom walls, respectively, and said mounting means includes a plate interposed between said spaced apart fins for lateral movement therebetween and restrained thereby against substantial axial movement.

3. A liquid receiving container according to claim 2 wherein said mounting means further includes a retainer member releasably secured to said plate for clamping said rod wiper element therebetween.

4. A liquid receiving container comprising, in combination with a reciprocal rod passing therethrough, a housing having a bottom wall and a side wall for receiving and accumulating a liquid comprised of oil and water components, said bottom wall being provided with an opening for said rod, an outlet in said housing side wall spaced above said bottom wall, and means in said housing for retaining therein the oil component while enabling the water component to be discharged through said outlet.

5. A liquid receiving container according to claim 4 wherein said last mentioned means comprises a baffle plate mounted in said container in spaced relation to the mouth of said outlet and terminating in a lower edge below said outlet in spaced relation to said container bottom wall and an upper edge above the lower level of said outlet.

6. A liquid receiving container according to claim 4 wherein said retaining means comprises a pair of barrier walls on opposite sides of said outlet and projecting inwardly and upwardly from said side wall and said bottom wall, respectively; a baffle plate mounted on said barrier walls in spaced relation to the mouth of said outlet and having a lower edge below said outlet in spaced relation to said bottom wall forming a passage communicating with said outlet, said barrier walls and said baffle plate extending above the lower level of said outlet.

7. A rod wiper assembly comprising: an annular split rod wiper element, a plate having a cavity therein for receiving the major portion of said rod wiper element, a retainer member having a cavity for receiving the remaining portion of said rod wiper element, said rod wiper element having opposite sides in sealing engagement against the opposed walls of said cavities, and means releasably securing said retainer member to said plate, said releasable securing means comprising fastener elements threadable into said plate between a partially threaded position and a substantially fully threaded position and radially projecting portions on said retainer member having grooves for receiving said fastener elements, and means preventing disengagement of said grooves from said fastener elements in the substantial fully threaded positions thereof.

8. A rod wiper assembly according to claim 7 wherein said grooves are diametrically opposed and oppositely oriented enabling rotation of said retainer member in one direction only relative to said plate in the partially threaded position of said fastener elements.

9. A rod wiper assembly according to claim 7 wherein said disengagement preventing means comprises abutments on said radially projecting portions adjacent said grooves engagable by portions of said fastener elements in the substantially fully threaded positions thereof.

* * * * *